(12) United States Patent
Weber et al.

(10) Patent No.: US 12,447,701 B2
(45) Date of Patent: Oct. 21, 2025

(54) QUICK-REPAIR PATCH FOR RENOVATING EXTERNAL DAMAGE, AND QUICK-REPAIR METHOD

(71) Applicant: Airbus Operations GmbH, Hamburg (DE)

(72) Inventors: Lutz Weber, Hamburg (DE); Michael Kaste, Jork (DE)

(73) Assignee: Airbus Operations GmbH, Hamburg (DE)

( * ) Notice: Subject to any disclaimer, the term of this patent is extended or adjusted under 35 U.S.C. 154(b) by 370 days.

(21) Appl. No.: 17/582,126

(22) Filed: Jan. 24, 2022

(65) Prior Publication Data

US 2022/0234316 A1 Jul. 28, 2022

(30) Foreign Application Priority Data

Jan. 28, 2021 (DE) ..................... 10 2021 101 981.8

(51) Int. Cl.
*B29C 73/10* (2006.01)
*B64D 45/02* (2006.01)
*B29L 31/30* (2006.01)

(52) U.S. Cl.
CPC .............. *B29C 73/10* (2013.01); *B64D 45/02* (2013.01); *B29L 2031/3076* (2013.01)

(58) Field of Classification Search
CPC . B29C 73/10; B64D 45/02; B29L 2031/3076; B64F 5/40; B64F 5/10; B32B 27/40; B32B 3/08; B32B 5/02; B32B 9/007; B32B 9/04; B32B 15/00; B32B 15/04; B32B 27/06; B32B 27/12; B32B 33/00; B32B 2262/0269; B32B 2262/101; B32B 2307/21; B32B 2307/714; C09J 7/29; C09J 2203/35; C09J 2400/163; C09J 2475/006
See application file for complete search history.

(56) References Cited

U.S. PATENT DOCUMENTS

| | | | |
|---|---|---|---|
| 2006/0078705 | A1 | 4/2006 | Glatkowski et al. |
| 2009/0114427 | A1 | 5/2009 | Feider et al. |
| 2010/0132875 | A1 | 6/2010 | Ackerman |
| 2014/0326389 | A1* | 11/2014 | Blanchard ............... B29C 73/12 156/64 |

(Continued)

OTHER PUBLICATIONS

German Search Report for Application No. 102021101981 dated Apr. 23, 2021.

(Continued)

*Primary Examiner* — Brian Handville
(74) *Attorney, Agent, or Firm* — KDW Firm PLLC (57) ABSTRACT

A quick-repair patch for renovating external damage, and quick-repair method for quick repairs of local and structurally mechanically irrelevant damage to aircraft components. The quick-repair patch has a layer structure with a plastic film, to which lightning protection is applied, and an adhesive layer, which is arranged at least on the plastic film. The quick-repair patch can be adhesively bonded to the damage such that the lightning protection is in electrical contact with the lightning protection of the component. The quick-repair patch can have a QR code or an RFID tag, by which specifications relating to the quick-repair patch or to the quick repair can be stored or retrieved.

15 Claims, 4 Drawing Sheets

(56) References Cited

U.S. PATENT DOCUMENTS

| | | | | |
|---|---|---|---|---|
| 2015/0090392 A1* | 4/2015 | Bertrand | ............... | G05B 19/401 |
| | | | | 156/64 |
| 2015/0267016 A1* | 9/2015 | Humiston | ............... | B32B 5/026 |
| | | | | 442/268 |
| 2016/0023777 A1* | 1/2016 | Jones | ............... | B64D 45/02 |
| | | | | 29/825 |
| 2018/0354653 A1* | 12/2018 | Sachse | ............... | G07C 5/085 |
| 2021/0402720 A1* | 12/2021 | Christy | ............... | B29C 73/10 |
| 2022/0169403 A1* | 6/2022 | Chirila | ............... | B32B 5/26 |

OTHER PUBLICATIONS

European Search Report for Application No. 22151369 dated Jul. 8, 2022.

* cited by examiner

QUICK-REPAIR PATCH FOR RENOVATING EXTERNAL DAMAGE, AND QUICK-REPAIR METHOD

CROSS-REFERENCE TO RELATED APPLICATION

This application claims priority to German Patent Application No. 10 2021 101 981.8 filed Jan. 28, 2021, the entire disclosure of which is incorporated by reference herein.

TECHNICAL FIELD

The disclosure herein relates to a quick-repair patch, preferably for aircraft, and to a quick-repair method. The disclosure herein also relates to a repair arrangement and to uses of a quick-repair patch.

BACKGROUND

Civilian and military aircraft, helicopters and drones, and also motor vehicles, ships and wind turbines (or their rotor blades) are customarily produced from metal or composite materials. In the event of a lightning strike, repairs can be necessary. The most common type of damage in the event of a lightning strike is merely superficial damage, i.e. damage to the paint and possibly to a few deeper layers. This generally results in no significant material damage which can adversely affect the structure.

After such an incident, local and structurally mechanically irrelevant damage (scratches, lacquer chipping, tufting and the like) of this type has up to now been temporarily repaired by what is known as a high-speed tape (HST, self-adhesive aluminum foil) on account of temporal restrictions and limited repair opportunities. HST is favorable and available at many airports.

SUMMARY

An object of the disclosure herein is to improve quick repairs of local and structurally mechanically irrelevant damage, such that in particular not only operability but also functionality can be established.

The object is achieved by the subject matter disclosed herein. Preferred developments are disclosed herein.

The disclosure herein provides a quick-repair patch, which serves to renovate local and structurally mechanically irrelevant damage to a component, preferably to an aircraft component, which contains a covering layer and lightning-strike surface protection located therebeneath, wherein the quick-repair patch has a layer structure and the layer structure comprises:
- a plastic film layer, which can be materially bonded to the covering layer and faces away from the damage when the quick-repair patch fastened to the component;
- an electrically conductive lightning-protection layer, which is suitable for a lightning-protection function or an electromagnetic-interference-protection function, is arranged on the plastic film layer and makes electrically conductive contact with the lightning-strike surface protection when the quick-repair patch is fastened to the component;
- a fastening layer, which is suitable for fastening the quick-repair patch to the component by a material bond and which is arranged at least on the plastic film layer on the same side as the electrically conductive lightning-protection layer.

It is preferred that the plastic film layer contains reinforcing fibers. It is preferred that the plastic film layer contains a material that attenuates radar radiation, preferably absorbs radar radiation. It is preferred that the plastic film layer contains an electrically conductive material. It is preferred that the plastic film layer contains a material that attenuates, preferably absorbs, UV light or ionizing radiation.

It is preferred that the plastic film layer is electrically insulated from the lighting-protection layer.

It is preferred that the plastic film layer has a larger surface area than the lightning-protection layer, wherein the plastic film layer has a peripheral region which is arranged between the outer contour of the plastic film layer and the outer contour of the lightning-protection layer.

It is preferred that the fastening layer is applied to the peripheral region or is arranged on the peripheral region.

It is preferred that the layer structure has a functional layer. It is preferred that the functional layer is arranged on that side of the plastic film layer that faces away from the lightning-protection layer. It is preferred that the functional layer has a reinforcing function, a camouflage function, a static-discharge-protection function and/or a protective function against radiation, in particular against UV radiation and/or ionizing radiation.

It is preferred that the layer structure comprises a reinforcing layer, which contains reinforcing fibers and is arranged on the plastic film layer. It is preferred that the layer structure comprises a camouflage layer, which contains a material that attenuates radar radiation, preferably absorbs radar radiation. It is preferred that the layer structure comprises an electrostatic-discharge-protection layer, which contains an electrically conductive material. It is preferred that the layer structure has a connecting layer, which is arranged between the plastic film layer and the lightning-protection layer and materially bonds them to one another. It is preferred that the layer structure has a radiation-protection layer, which contains a material that attenuates, preferably absorbs, UV light or ionizing radiation.

It is preferred that the reinforcing layer, the camouflage layer, the discharge-protection layer and/or the radiation-protection layer are combined in a common functional layer. It is preferred that the reinforcing layer, the camouflage layer, the discharge-protection layer, the radiation-protection layer and/or the functional layer are arranged on that side of the plastic film layer that faces away from the lightning-protection layer.

It is preferred that the layer structure is formed in the following sequence: plastic film layer, lightning-protection layer, fastening layer. It is preferred that the layer structure is formed in the following sequence: plastic film layer, connecting layer, lightning-protection layer, fastening layer.

It is preferred that the layer structure is formed in the following sequence: reinforcing layer or camouflage layer or discharge-protection layer or radiation-protection layer, plastic film layer, lightning-protection layer, fastening layer. It is preferred that the layer structure is formed in the following sequence: reinforcing layer or camouflage layer or discharge-protection layer or radiation-protection layer, plastic film layer, connecting layer, lightning-protection layer, fastening layer.

It is preferred that the layer structure is formed in the following sequence: functional layer, plastic film layer, lightning-protection layer, fastening layer. It is preferred that the layer structure is formed in the following sequence: functional layer, plastic film layer, connecting layer, lightning-protection layer, fastening layer.

It is preferred that the layer structure consists only of the layers mentioned.

The quick-repair patch preferably comprises an information tag or device, preferably a QR code and/or an RFID tag, by virtue of which specifications relating to quick repair carried out by the quick-repair patch can be stored or retrieved. It is preferred that the specifications are stored in or can be retrieved from the RFID tag. It is preferred that the specifications can be stored or retrieved by a computer using the QR code.

It is preferred that the information tag or device is contained in or attached to the plastic film layer.

The disclosure herein provides a quick-repair patch, which serves to renovate local and structurally mechanically irrelevant damage to a component, preferably to an aircraft component, which contains a covering layer and lightning-strike surface protection located therebeneath, wherein the quick-repair patch has a layer structure and the layer structure consists of:
- a plastic film layer, which can be materially bonded to the covering layer and faces away from the damage when the quick-repair patch is fastened to the component;
- an electrically conductive lightning-protection layer, which is suitable for a lightning-protection function or an electromagnetic-interference-protection function, is arranged on the plastic film layer and makes electrically conductive contact with the lightning-strike surface protection when the quick-repair patch is fastened to the component;
- a fastening layer, which is suitable for fastening the quick-repair patch to the component by a material bond and which is arranged at least on the plastic film layer on the same side as the electrically conductive lightning-protection layer;
- optionally a connecting layer, which is arranged between the plastic film layer and the lightning-protection layer and materially bonds them to one another;
- optionally a functional layer, which is arranged on that side of the plastic film layer that faces away from the lightning-protection layer.

It is preferred that the functional layer consists of a reinforcing layer, which contains reinforcing fibers; and/or a camouflage layer, which contains a material that attenuates radar radiation, preferably absorbs radar radiation; and/or an electrostatic-discharge-protection layer, which contains an electrically conductive material.

It is preferred that the plastic film layer contains reinforcing fibers. It is preferred that the plastic film layer contains a material that attenuates radar radiation, preferably absorbs radar radiation. It is preferred that the plastic film layer contains an electrically conductive material.

It is preferred that the plastic film layer is electrically insulated from the lighting-protection layer.

The disclosure herein provides a repair arrangement, which comprises a component, preferably an aircraft component, and a quick-repair patch described above, wherein the component has a covering layer and lightning-strike surface protection located therebeneath and also local and structurally mechanically irrelevant damage, wherein the quick-repair patch covers the damage and is materially bonded to the component by the fastening layer, wherein the plastic film layer is materially bonded to the covering layer and faces away from the damage, wherein the electrically conductive lightning-protection layer is arranged between the plastic film layer and the lightning-strike surface protection.

It is preferred that the lightning-protection layer is electrically conductively connected to the lightning-strike surface protection.

The disclosure herein provides an aircraft comprising a quick-repair patch described above and/or a repair arrangement described above, wherein the component is preferably selected from among lift aids, flaps, leading-edge slats, control surfaces, elevators, rudders, ailerons, fuselage parts, rotor blades, wing surfaces, engine nacelles, horizontal tail units and/or vertical tail units.

The disclosure herein provides a quick-repair method for renovating local and structurally mechanically irrelevant damage to a component, preferably to an aircraft component, which contains a covering layer and lightning-strike surface protection located therebeneath, wherein the method comprises:
1. producing a connecting surface on the component for a quick-repair patch and optionally exposing the lightning-strike surface protection;
2. positioning a quick-repair patch described above on the damage; and
3. fastening the quick-repair patch to the connecting surfaces produced in step 1 by pressing it on, as a result of which the plastic film layer is materially bonded to the covering layer.

It is preferred that, in step 1, the production of the connecting surfaces and/or the exposure of the lightning-strike surface protection is done e.g. by grinding.

It is preferred that, in step 1, the production includes cleaning, drying and/or removing grease from a surface region of the component, in order to provide the connecting surface.

It is preferred that, in step 2, the quick-repair patch is positioned in such a way that the lightning-protection layer can make contact with the lightning-strike surface protection.

It is preferred that, in step 3, the lightning-protection layer is brought into electrically conductive contact with the lightning-strike surface protection.

The disclosure herein provides the use of a quick-repair patch described above for repairing local and structurally mechanically irrelevant damage to an aircraft component.

The concept described herein makes it possible to increase the typical service life of approximately 2 months of quick repairs. Consequently, the time until complete repair in compliance with the repair manual can be lengthened. Corresponding adaptation of the plastic film makes it possible to adapt the patch to the location to be repaired, with the result that the quick repair is less visible overall.

Military aircraft usually have a coating that reduces the radar signature. By the quick-repair patch, what are known as hotspots, which adversely affect the radar signature, can be avoided.

The smart quick-repair patch (or smart quick surface repair patch, SQSR patch) presented here is a multilayered patch of predefined size and generally has three to four layers.

Layer 1 is a plastic film layer. This may be dyed. The plastic film layer is a polyurethane film, for example. The plastic film may contain a marking in the form of information tag or device, for example in the form of a QR code or an RFID tag. Various specifications relating to the patch and to the quick repair may be stored therein (for example the type, production date, installation date and individual number). The plastic film layer may optionally contain a reinforcement of reinforcing fibers (for example glass fibers, Kevlar). These are especially suitable for repairing fuel tanks or combat damage. The plastic film may optionally also be provided with camouflage-improving properties (for example by virtue of suitable materials that absorb or attenuate radar radiation). A colorless covering layer may also be applied.

Layer 2 contains electrically conductive material. The electrically conductive material used may be for example metal stretch foil, perforated metal foil, expanded metal grids, graphene or the like. This layer serves as lightning-strike surface protection (LSSP), or shielding against electromagnetic interference (EMI shielding). Depending on the material, an additional adhesive layer in the form of a connecting layer may be provided between layer 1 and layer 2.

Layer 3 is a fastening layer, for example made of adhesive film. This can be applied only to layer 1. This layer may additionally also be arranged on layer 2, a conductive adhesive preferably being used for this.

It is also possible for a layer referred to as layer $1^+$ to be arranged on layer 1. This layer may optionally be configured as a reinforcing layer with the reinforcing fibers, as a camouflage layer with the camouflage-improving materials, or as electrostatic-discharge protection. The layer can also be referred to as functional layer.

The sequence of the layers can be adapted to the corresponding application. Similarly, the shaping of the patch can be adapted to different situations. The patch may thus be square, rectangular, circular or elliptical. The same applies for the shape of layer 2. The shape of the layer 2 may differ from the overall shape.

Advantageously, the quick-repair patch may be attached by a method similar to the HST method. The configuration of the patch makes it possible to better avoid peeling off. By contrast to HST, the patch is also watertight and thus increases the corrosion resistance. Even damaged logos or markings on the aircraft can be repaired with low outlay.

By contrast to HST, the patch makes it possible to postpone the maintenance of relatively small damage until the regular D-check. For individual cases, the patch may even be permissible as permanent repair.

Correspondingly, the concepts presented here allow the operator to repair surface damage more simply, more durably and more securely. The repair patch makes long-lasting protection which reduces, minimizes or even avoids surface damage associated with a lightning strike possible.

BRIEF DESCRIPTION OF THE DRAWINGS

Example embodiments will be explained in more detail with reference to the appended schematic drawings, in which.

DETAILED DESCRIPTION

Figure 1:
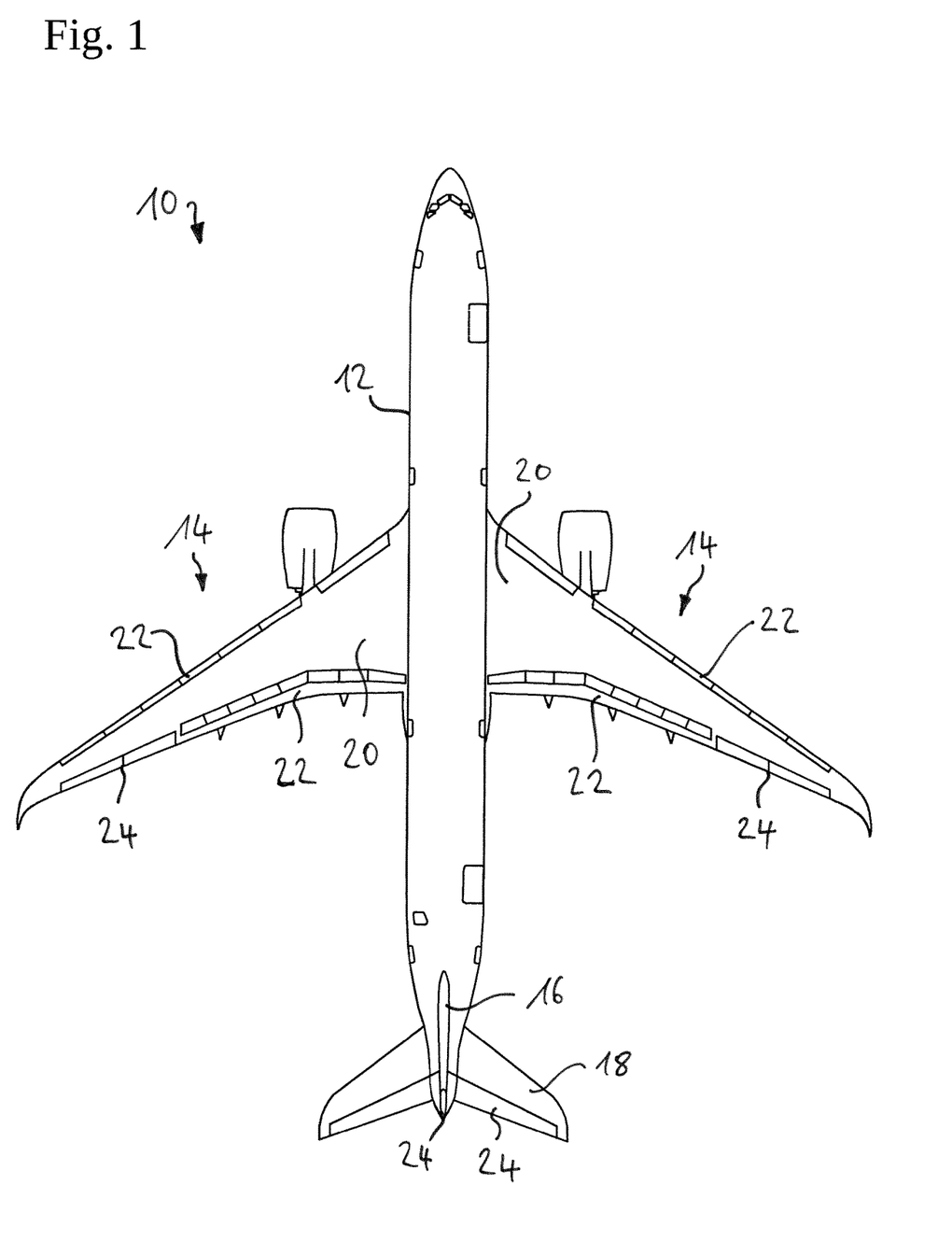
FIG. 1 shows an example embodiment of an aircraft.

Reference is first of all made to FIG. 1, which shows an aircraft 10. In a manner known per se, the aircraft 10 comprises a fuselage 12 on which a pair of wings 14 are arranged. A vertical tail unit 16 and a horizontal tail unit 18 are arranged on the rear end of the fuselage 12. Each wing 14 comprises wing surfaces 20 and lift aids 22. The wing 14, the vertical tail unit 16 and the horizontal tail unit 18 additionally have control surfaces 24.

The abovementioned components 26 (FIG. 4 for example) may have local and structurally mechanically irrelevant damage 28 caused by a lightning strike, for example. The component 26 comprises a main body 30. The main body 30 may be formed from metal or a fiber-reinforced plastic. The component 26 also comprises lightning-strike surface protection 32. The lightning-strike surface protection 32 may also be formed by the main body 30 itself. In addition, the component 26 comprises a covering layer 34, which is arranged on the lightning-strike surface protection 32.

Figure 2:
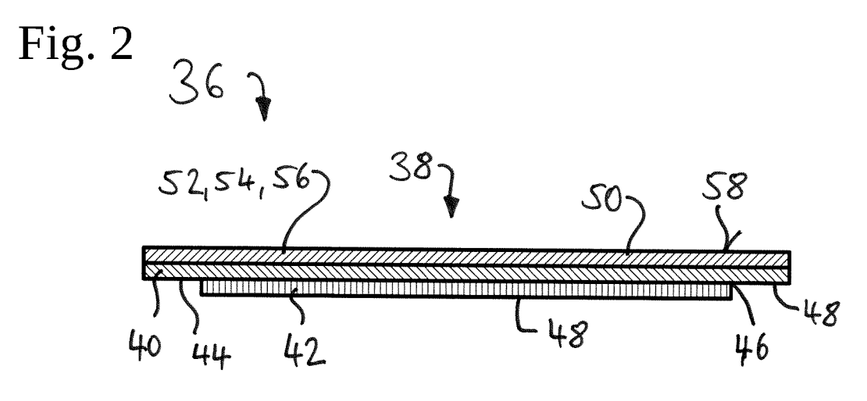
FIG. 2 shows an example embodiment of a quick-repair patch.
Figure 3:
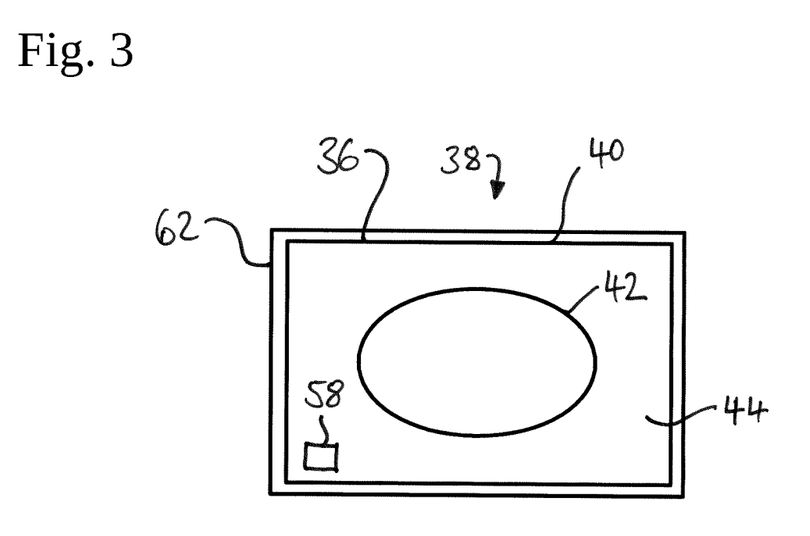
FIG. 3 shows a top view of a quick-repair patch.
Figure 4:
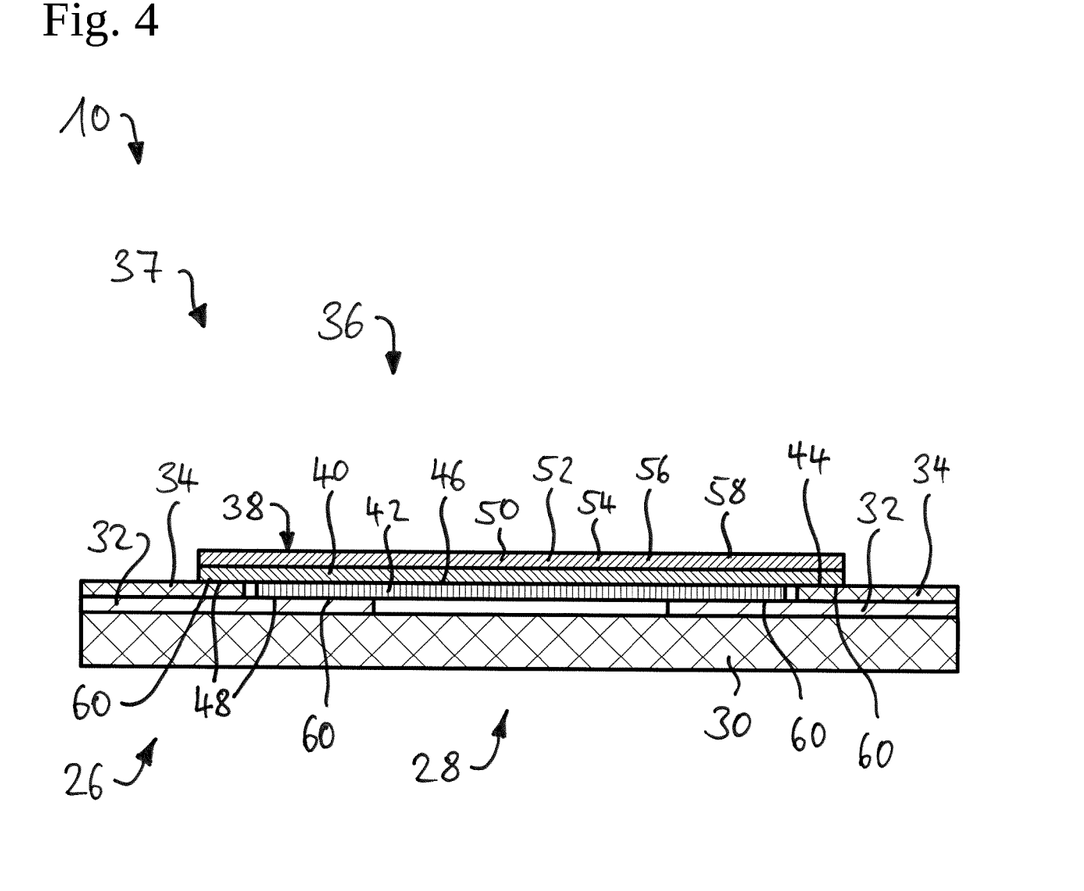
FIG. 4 shows an example embodiment of a repair arrangement having a quick-repair patch from FIG. 2.

FIG. 2 through FIG. 4 schematically show a quick-repair patch 36, which can be used to repair the damage 28 in a repair arrangement 37 (FIG. 4). The quick-repair patch has a thickness of approximately 0.1 mm to 0.2 mm.

The quick-repair patch 36 comprises a layer structure 38. The layer structure 38 has a plastic film layer 40. The plastic film layer 40 is preferably formed from a polyurethane film. The plastic film layer 40 may be dyed. The plastic film layer 40 is rectangular in the present case. The plastic film layer 40 may, however, also have other shapes, for example a circular shape, elliptical shape or square shape.

The layer structure 38 comprises an electrically conductive lightning-protection layer 42 arranged on one face of the plastic film layer 40. The lightning-protection layer 42 contains an electrically conductive material of metal or graphene. The lightning-protection layer 42 may accordingly contain expanded metal, perforated metal foil and the like. The lightning-protection layer 42 has an elliptical shape in the present case. The lightning-protection layer 42 may, however, also have other shapes, for example a circular shape, rectangular shape or square shape. The lightning-protection layer 42 has a smaller surface area than the plastic film layer 40. When viewed from the top (FIG. 3), the plastic film layer 40 has a peripheral region 44, which is arranged between the contour of the plastic film layer 40 and of the lightning-protection layer 42.

Arranged between the plastic film layer 40 and the lightning-protection layer 42 in the thickness direction is a thin connecting layer 46, which materially bonds the two layers to one another.

The layer structure 38 also comprises a fastening layer 48 arranged on the plastic film layer 40. The fastening layer 48 contains an adhesive, in order to materially bond the quick-repair patch 36 to the component 26. In a variant, the fastening layer 48 may be materially bonded to the component 26 by welding. The fastening layer 48 is preferably applied to or arranged on only the peripheral region 44. The fastening layer 48 may additionally also be applied to the lightning-protection layer 42. The adhesive is preferably conductive in the region of the lightning-protection layer 42. As an alternative, a region of the lightning-protection layer 42 is exposed, in order to allow electrical contact between the lightning-protection layer 42 and the lightning-strike surface protection 32.

The layer structure 38 may additionally have a functional layer 50. The functional layer 50 is arranged on that face of the plastic film layer 40 that faces away from the lightning-protection layer 42.

The functional layer 50 may have a reinforcing layer 52, which contains reinforcing fibers. Glass fibers or Kevlar are/is used as reinforcing fibers.

The functional layer 50 may have a camouflage layer 54, which contains a radar-absorbing or radar-attenuating additive or additives.

The functional layer 50 may contain an electrostatic-discharge-protection layer 56, which contains conductive material.

The functional layer 50 is preferably in the form of an individual layer in which the reinforcing layer 52, the camouflage layer 54 and the discharge-protection layer 56 are integrated.

As an alternative, the functions of the reinforcing layer 52, the camouflage layer 54 or the discharge-protection layer 56 may be realized in the plastic film layer in any desired combination.

The quick-repair patch 36 may also have an information tag or device 58, by which specifications relating to the quick-repair patch 36 and/or the quick repair carried out therewith can be stored or retrieved. Included in the specifications are the type and production date of the quick-repair patch 36, the repair date, the repair location and any further information, in particular technical information, that is relevant for the quick-repair patch 36 or the repair as such. The information tag or device 58 may be a QR code or an RFID tag, for example. The QR code and the RFID tag may each serve as a reference for the corresponding specifications, which are stored in a computer system or computer network. The RFID tag may also be designed such that it contains the specifications directly.

A quick repair will be explained in more detail below with reference to FIG. 4. The damage 28 is first of all machined, e.g. by grinding, to afford a smooth, clean, dry and grease-free connecting surface 60 for the quick-repair patch 36.

Then, an appropriate quick-repair patch 36 is selected and placed over the damage 28 in such a way that the damage is completely covered. Subsequently, the quick-repair patch 36 is pressed onto the component 26. In the process, the plastic film layer 40, in particular the peripheral region 44, is pressed against the covering layer 34 and materially bonded thereto by way of the fastening layer 48. Furthermore, the lightning-protection layer 42 is pressed against the lightning-strike surface protection 32, resulting in electrical contact. If it is also the case that the lightning-protection layer 42 is coated with adhesive, then the lightning-protection layer 42 is also materially bonded to the lightning-strike surface protection 32.

Figure 5:
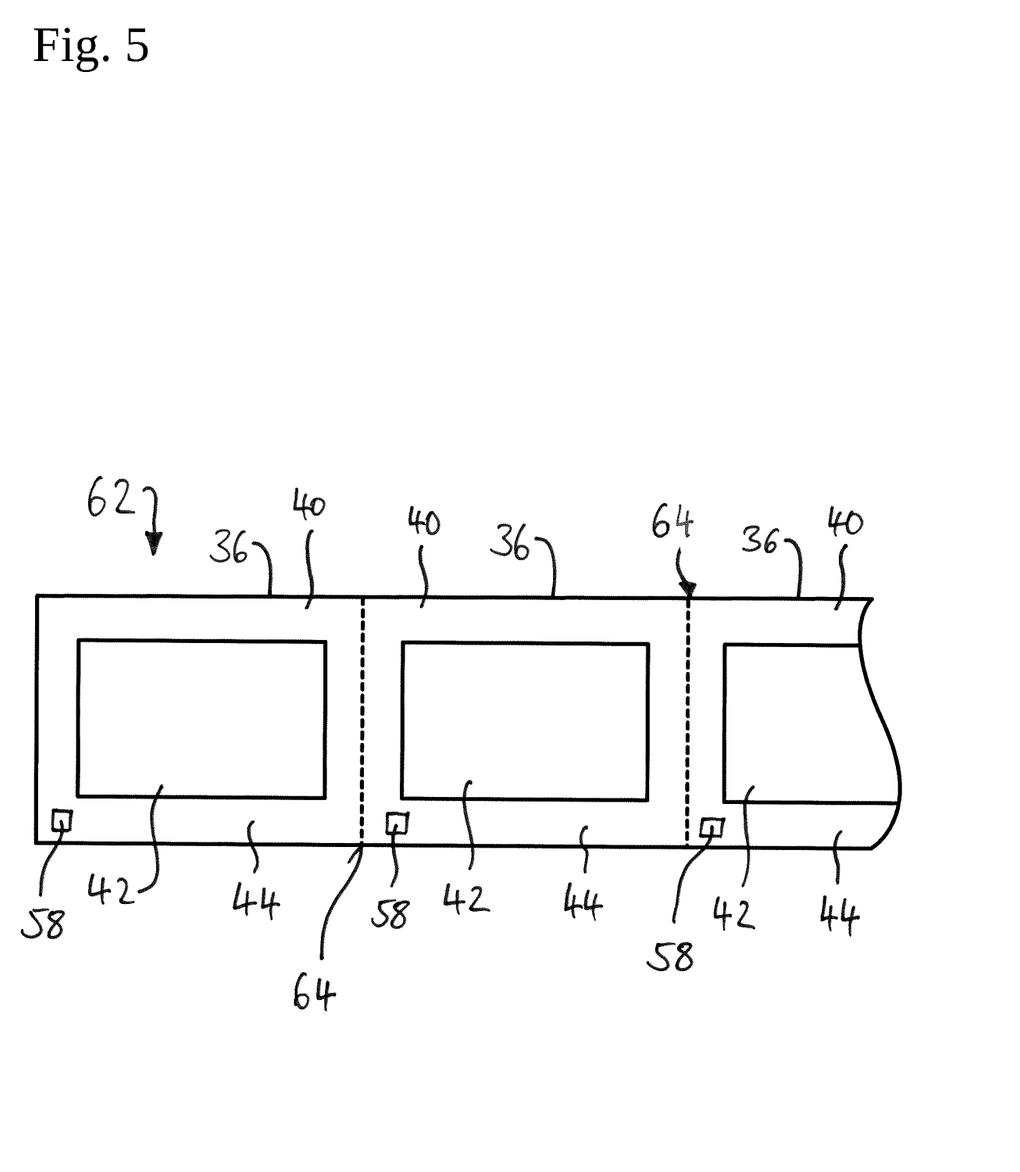
FIG. 5 shows an example embodiment of a patch strip.

Reference is made below to FIG. 5, which shows a form of administration of quick-repair patches 36 in the form of a patch strip 62. In this context, a plurality of quick-repair patches 36 are connected to one another at a separable edge region 64, for example by a perforation. The patch strip 62 may be wound up in a roll. The desired quick-repair patch 36 is separated from the patch strip 62 prior to use.

In order to improve quick repairs of local and structurally mechanically irrelevant damage (28) to aircraft components (26), a quick-repair patch (36) is proposed. The quick-repair patch (36) has a layer structure (38) with a plastic film (40), to which lightning protection (42) is applied, and an adhesive layer (48), which is arranged at least on the plastic film (40). The quick-repair patch (36) may be adhesively bonded to the damage (28) such that the lightning protection (42) is in electrical contact with the lightning protection of the component (26). The quick-repair patch (36) may have a QR code or an RFID tag, by way of which specifications relating to the quick-repair patch (36) or to the quick repair (36) can be stored or retrieved.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

10 Aircraft
12 Fuselage
14 Wing
16 Vertical tail unit
18 Horizontal tail unit
20 Wing surface
22 Lift aid
24 Control surface
26 Component
28 Damage
30 Main body
32 Lightning-strike surface protection
34 Covering layer
36 Quick-repair patch
37 Repair arrangement
38 Layer structure
40 Plastic film layer
42 Lightning-protection layer
44 Peripheral region
46 Connecting layer
48 Fastening layer
50 Functional layer
54 Camouflage layer
56 Discharge-protection layer
58 Information tag or device
60 Connecting surface
62 Patch strip
64 Edge region

The invention claimed is:

1. A patch strip comprising a plurality of quick-repair patches for renovating local and structurally mechanically irrelevant damage to a component or an aircraft component, comprising a covering layer and lightning-strike surface protection located therebeneath, wherein each of the quick-repair patches has a layer structure and the layer structure comprises:

a plastic film layer, which is configured to be materially bonded to the covering layer in an arrangement in which the plastic film layer faces away from the damage when the quick-repair patch is fastened to the component;

an electrically conductive lightning-protection layer which is suitable for a lightning-protection function or an electromagnetic-interference-protection function and is bonded to the plastic film layer, wherein the lightning-protection layer is configured to make electrically conductive contact with the lightning-strike surface protection when the quick-repair patch is fastened to the component; and a fastening layer, which is suitable for fastening the quick-repair patch to the component by a material bond;

wherein the lightning-protection layer defines a surface area that is smaller than a surface area of the plastic film layer such that the plastic film layer defines a peripheral region which is between a contour of the plastic film layer and the lightning-protection layer;

wherein the fastening layer is arranged only on the peripheral region of the plastic film layer on a same side as the electrically conductive lightning-protection layer; and wherein the quick-repair patches are individually separably connected to one another at an edge of the peripheral region.

2. The patch strip according to claim 1, wherein the plastic film layer contains reinforcing fibers, a material that attenuates radar radiation or absorbs radar radiation, and/or an electrically conductive material, wherein the plastic film layer is electrically insulated from the lightning-protection layer, and/or wherein the plastic film layer contains a material that attenuates or absorbs UV light or ionizing radiation.

3. The patch strip according to claim 1, wherein the layer structure comprises:
   a reinforcing layer, which contains reinforcing fibers and is on the plastic film layer; and/or
   a camouflage layer, which contains a material that attenuates radar radiation, or absorbs radar radiation; and/or
   an electrostatic-discharge-protection layer, which contains an electrically conductive material;
   a radiation-protection layer, which contains a material that attenuates, or absorbs, UV light or ionizing radiation; and/or
   a connecting layer, which is between the plastic film layer and the lightning-protection layer and materially bonds them to one another.

4. The patch strip according to claim 3, wherein the reinforcing layer, the camouflage layer, the discharge-protection layer and/or the radiation protection layer are combined in a common functional layer; and/or wherein the reinforcing layer, the camouflage layer, the discharge-protection layer, the radiation protection layer and/or the functional layer are on the side of the plastic film layer that faces away from the lightning-protection layer.

5. The patch strip according to claim 3, wherein the layer structure is formed in one of sequences of:
   plastic film layer, lightning-protection layer, fastening layer; or
   plastic film layer, connecting layer, lightning-protection layer, fastening layer; or
   reinforcing layer or camouflage layer or discharge-protection layer or radiation-protection layer, plastic film layer, lightning-protection layer, fastening layer; or
   reinforcing layer or camouflage layer or discharge-protection layer or radiation-protection layer, plastic film layer, connecting layer, lightning-protection layer, fastening layer; or
   functional layer, plastic film layer, lightning-protection layer, fastening layer; or
   functional layer, plastic film layer, connecting layer, lightning-protection layer, fastening layer.

6. The patch strip according to claim 1, wherein the layer structure consists only of the layers recited.

7. The patch strip according to claim 1, wherein each of the plurality of quick-repair patches comprises an information tag or device by which specifications relating to the quick-repair patch and/or to the quick repair carried out by the quick-repair patch can be stored or retrieved.

8. The patch strip according to claim 1, wherein the edge region is perforated for a purpose of separation.

9. The patch strip according to claim 1, wherein the patch strip is in a form of a roll.

10. A repair arrangement, which comprises a component or an aircraft component, and a quick-repair patch according to claim 1, wherein the component has a covering layer and lightning-strike surface protection located therebeneath and also local and structurally mechanically irrelevant damage, wherein the quick-repair patch covers the damage and is materially bonded to the component by the fastening layer, wherein the plastic film layer is materially bonded to the covering layer and faces away from the damage, wherein the electrically conductive lightning-protection layer is arranged between the plastic film layer and the lightning-strike surface protection.

11. An aircraft comprising a quick-repair patch according to claim 1, wherein the component is selected from the group consisting of lift aids, flaps, leading-edge slats, control surfaces, elevators, rudders, ailerons, fuselage parts, rotor blades, wing surfaces, engine nacelles, and horizontal tail units and/or vertical tail units.

12. A quick-repair method for renovating local and structurally mechanically irrelevant damage to a component or an aircraft component, which contains a covering layer and lightning-strike surface protection located therebeneath, wherein the method comprises:
   producing connecting surfaces on the component for a quick-repair patch and optionally exposing the lightning-strike surface protection;
   positioning a quick-repair patch according to claim 1 on the damage; and
   fastening the quick-repair patch to the connecting surfaces by pressing it on, as a result of which the plastic film layer is materially bonded to the covering layer and the lightning-protection layer is preferably brought into electrically conductive contact with the lightning-strike surface protection.

13. The quick-repair method according to claim 12, wherein producing the connecting surfaces and/or exposing the lightning-strike surface protection comprises grinding.

14. A method of using a quick-repair patch according claim 1 for repairing local and structurally mechanically irrelevant damage to an aircraft component.

15. The patch strip according to claim 7, wherein the information tag or device comprises a QR code and/or an RFID tag.

* * * * *